United States Patent
Koelle

(10) Patent No.: US 6,769,677 B2
(45) Date of Patent: Aug. 3, 2004

(54) DEVICE FOR TRANSPORTING AND READING FLAT MATERIAL

(75) Inventor: Helmut Koelle, Augsburg (DE)

(73) Assignee: Bowe Systec AG, Augsburg (DE)

( * ) Notice: Subject to any disclaimer, the term of this patent is extended or adjusted under 35 U.S.C. 154(b) by 16 days.

(21) Appl. No.: 10/221,886
(22) PCT Filed: Mar. 10, 2001
(86) PCT No.: PCT/EP01/02693
§ 371 (c)(1),
(2), (4) Date: Jan. 7, 2003
(87) PCT Pub. No.: WO01/75528
PCT Pub. Date: Oct. 11, 2001

(65) Prior Publication Data
US 2003/0141168 A1 Jul. 31, 2003

(30) Foreign Application Priority Data
Apr. 4, 2000 (DE) .......................... 100 16 763

(51) Int. Cl.$^7$ ............................... B65H 3/44
(52) U.S. Cl. ..................... 271/3.22; 271/302
(58) Field of Search .............. 271/3.22, 276, 271/194, 195, 302

(56) References Cited

U.S. PATENT DOCUMENTS 3,980,294 A 9/1976 Heinzer et al.
5,150,894 A * 9/1992 Ricciardi ................ 271/302
6,325,369 B1 * 12/2001 Strutt ..................... 271/9.02
6,460,842 B1 * 10/2002 Koelle ................... 270/58.01

FOREIGN PATENT DOCUMENTS

DE  4015210A1 A  11/1990
DE  198 07 944 A1  8/1999

* cited by examiner

Primary Examiner—Christopher P. Ellis
Assistant Examiner—Mark A. Deuble
(74) Attorney, Agent, or Firm—Martin Fleit; Paul D. Bianco; Fleit Kain Gibbons Gutman Bongini & Bianco, P.L.

(57) ABSTRACT

A device for reading flat material having an endless perforated belt, guided over two rollers, one of which is driven. Material is brought from a feeder to an inlet arranged on both sides of the rollers and the belt transports the material to an outlet. The material is retained against the belt by vacuum. The device is adjustable relative to the feeder and, in one position, the entrance to the inlet is at the level of the feeder and, in the other position, the entrance to the inlet is at the level of the feeder. At least one reading device is provided, for reading the markings from the material being transported on the belt.

On adjustment from the one position to the other, a reversal in the direction of rotation of the driven roller occurs and the reading device faces that side of the belt, the entrance to the inlet of which is at the level of the feeder.

12 Claims, 4 Drawing Sheets

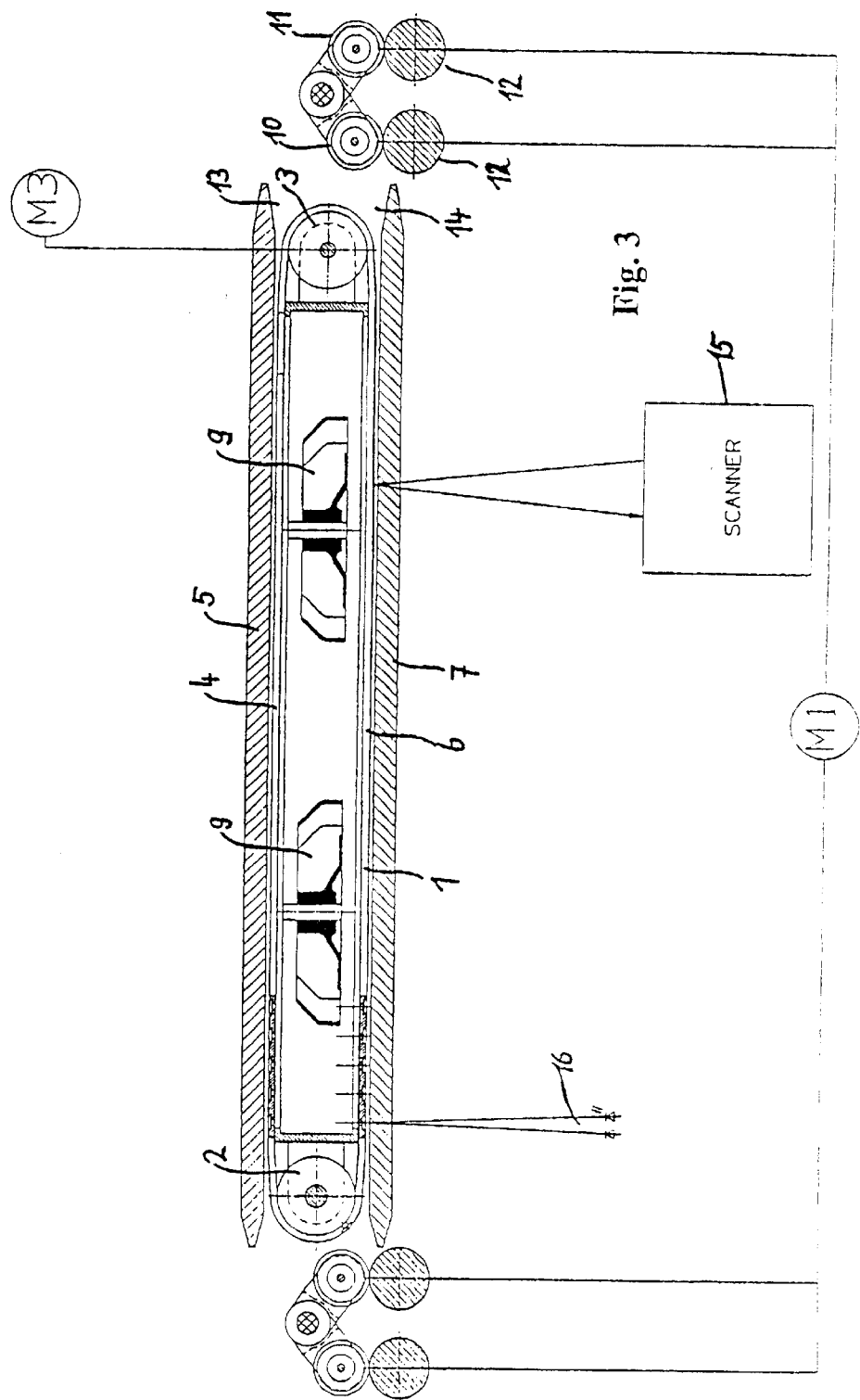

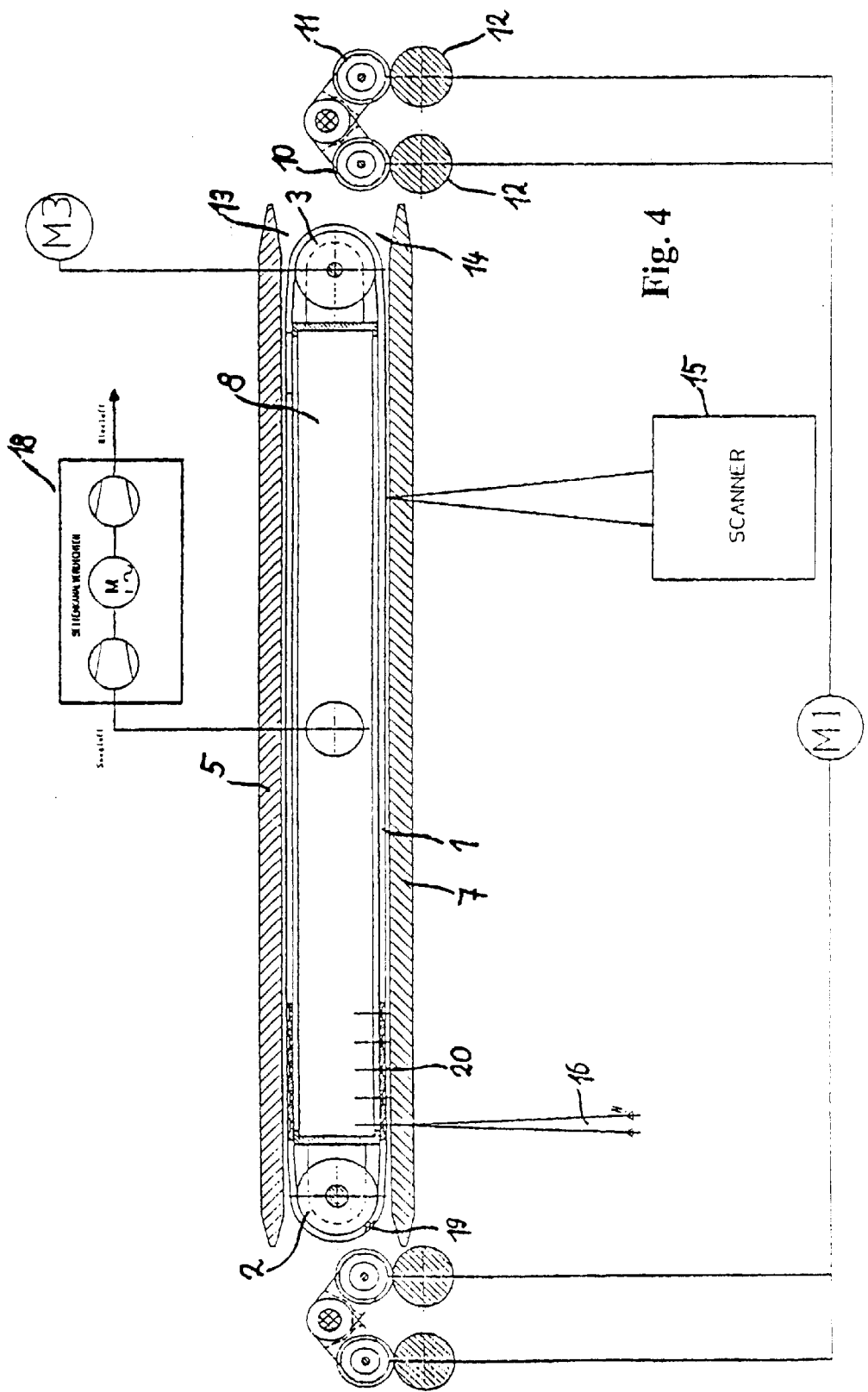

DEVICE FOR TRANSPORTING AND READING FLAT MATERIAL

BACKGROUND OF THE INVENTION

1. Field of the Invention

The invention concerns a device for reading sheet material.

2. Prior Art

Such a device is known from U.S. Pat. No. 3,980,294. It consists of an endless, perforated belt guided over two rollers. Between the upper and lower section of the belt there is a low-pressure chamber. Above the upper section of the belt there is a light source. This light source has a slit. A paper to be copied is held against this belt by low pressure acting at the perforations of the belt, and in this way the paper is carried past the light source, where the markings of the sheet are detected through the slit. With this known device, markings can be detected that are located on the top side of the sheet. In contrast, markings on the bottom side of the sheet cannot be detected.

A device for electronic transmission of information in text form on paper sheets or reels of paper is known from DE 198 07 944 A1, wherein the paper is transported between transport rollers and opposing counter rollers driven to rotate. In order to detect information on both sides of the paper in a passage, there is a device for detecting information on each side of the paper, where the information is converted into electronic signals in a control unit and then transmitted to a receiver.

SUMMARY OF THE INVENTION

The problem dealt with by the invention is the design of a device according to this class so that markings on both the top side of the material and also on the bottom side can be detected.

This problem is solved with the features of the invention by the provision of a device for reading sheet material, consisting of an endless, perforated belt guided over two rollers, of which one is driven, where material is guided from a feeding device to an inlet and the belt transports the material to an outlet, wherein the material is held against the belt by a low pressure acting at the perforations of the belt and there is at least one reading device that detects markings of the material transported by the belt, characterized in that there is an inlet on both sides of one of the rollers, in that the device can be adjusted relative to the feeding device, and in one position, one inlet is located at the height of the feeding device, and in the other position, the other inlet is located at the height of the feeding device, in that for a change from one position to the other, the direction of rotation of the driven rollers is reversed, and in that the one or more reading devices are directed towards the corresponding section of the belt, whose inlet is located at the height of the feeding device.

The device may be further characterized in that each section of the belt is covered by a transparent plate or characterized in that the plates can be removed. Further, the device may be characterized in that there is a low-pressure chamber between the first and the other section or characterized in that between the first and the other section there is at least one fan, whose direction of rotation is reversible, and in that the suction side of the fan is directed towards the corresponding section, whose inlet is located at the height of the feeding device.

The device may be characterized in that the transparent plates are reduced at the inlets or characterized in that the feeding device consists of two transport rollers arranged at a distance from each other with corresponding counter rollers. Further, the driven roller is driven by an electric motor that can change its direction of rotation. Also, the driven roller can be driven by a toothed belt that engages one side of the roller in one position and engages the other side of the roller in the other position. In addition, the reading device can be adjusted in the direction of a section and perpendicular to this direction.

The device may be characterized in that in the region of an outlet there is a detector that detects the leading edges of the material and that generates a signal reducing the speed of the belt when the leading edge is detected. In the device, the periphery of the rollers has pins that engage the perforations of the belt.

The invention relates to a device for the reading of flat material, comprising an endless perforated belt, guided over two rollers, of which one is driven. The material is brought from a feeder device to an inlet and the belt transports said material to an outlet, whereby the material is retained against the belt by a vacuum acting on the perforations of the belt and at least one reading device is provided, for reading the markings from the material being transported on the belt. In conventional devices of this type only markings may be read which lie on the upper surface of the sheet. The aim of the invention is to provide an embodiment of the device with which markings may also be read which lie on the under surface of the sheet. Said aim is achieved, whereby an inlet is arranged on both sides of the rollers, said device is adjustable relative to the feed unit and, in the one position, the one inlet, is at the level of the feed unit and, in the other position, the other inlet is at the level of the feed unit. On an adjustment from the one position to the other a reversal in the direction of rotation of the driven roller occurs and the at least one reading device faces that side of the belt, the inlet of which is at the level of the feed unit.

In addition to the advantage of two-sided readability, another advantage is that there is no restriction on the reading area. Reading is possible both while moving and at a standstill. Due to the small masses to be moved, high acceleration is possible for the sheet material to be transported.

BRIEF DESCRIPTION OF THE DRAWINGS

An embodiment is explained in more detail in the following with reference to the drawings. Shown are:

FIG. 3: a vertical section through a first embodiment of the device, and

FIG. 4: a vertical section through a second embodiment.

DETAILED DESCRIPTION OF PREFERRED EMBODIMENTS

Figure 1:
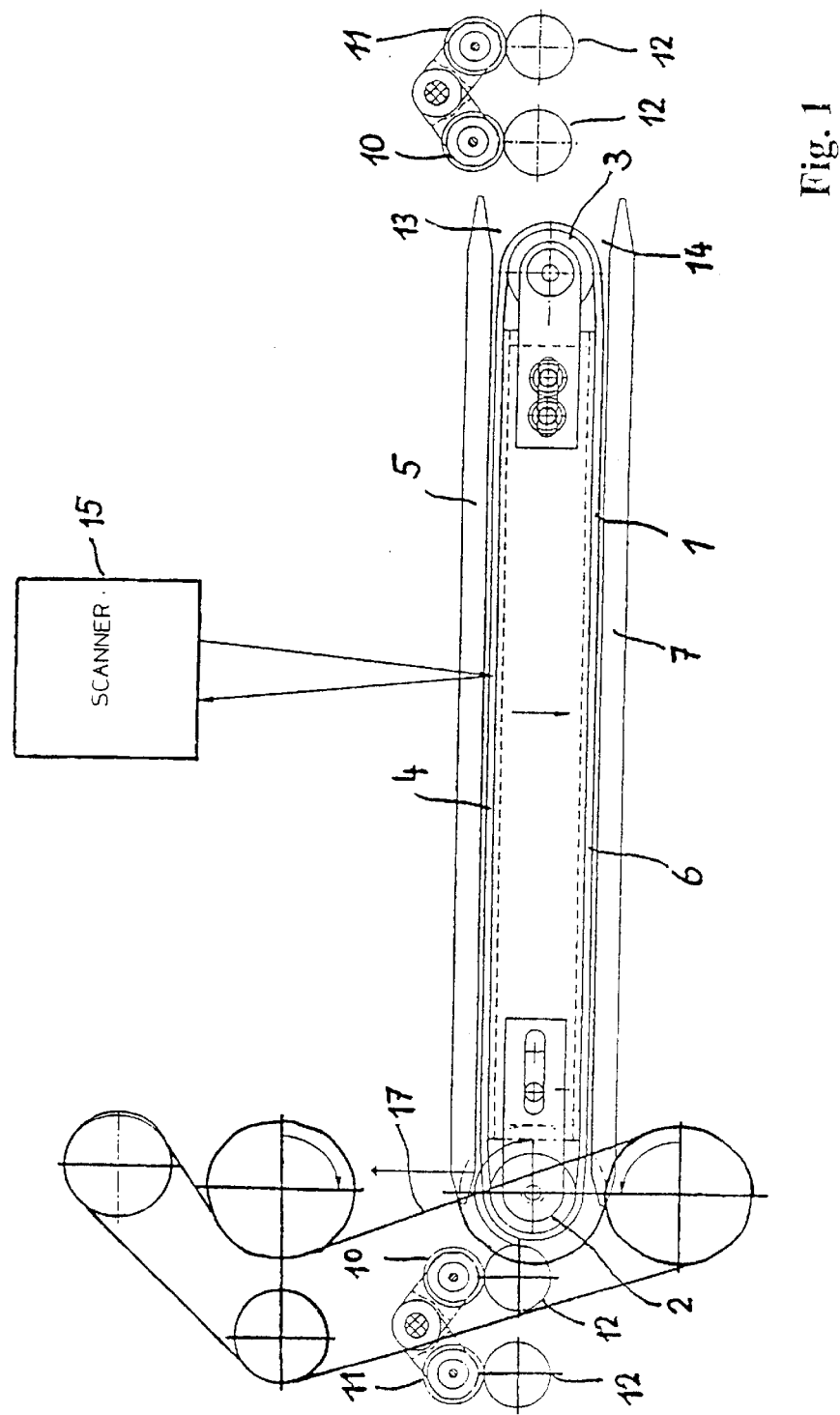
FIG. 1: a side view of the device for reading markings on the top side of a sheet.

The device features an endless, perforated belt 1 that is guided over two rollers 2, 3, of which one roller is driven. The top section 4 of the belt 1 is covered by a transparent plate 5 that is preferably made of glass. There is another transparent plate 7 underneath the lower section 6. The plates 5, 7 are located a slight distance from the belt 1.

According to FIG. 3, two fans 9 are located between the upper and lower sections 4, 6. The direction of rotation of the fans 9 can be reversed. Instead of the fans 9, the space between the sections 4, 6 can be configured as a low pressure chamber 8, as shown in FIG. 4. This is connected to the suction side of a compressor 18.

There are two corresponding transport rollers 10, 11 before the rollers 2, 3 at a horizontal distance from each other, and a counter roller 12 contacts each transport roller. The rollers 2, 3 and the plates 5, 7 can be adjusted in height relative to the transport rollers 10, 11 and their counter rollers 12.

The periphery of the rollers 2, 3 has pins 19 that engage the perforations 20 of the belt 1.

If the top side of the sheet is to be read, then it is guided over the right transport rollers 10, 11 to the upper inlet 13. Here, the fans 9 are switched so that a low pressure is created above the fans 9. In this way, a low pressure is created through the perforations of the belt 1 at the upper section 4, and this low pressure holds the sheet to be transported by the belt 1 against the upper section 4. During transport along the section 4, the upper side of the sheet is scanned by a reading device 15 that is arranged above the plate 5.

If the speed of the sheet is to be reduced during reading, or if the sheet is to be brought to a standstill, then there can be a detector that is arranged above the plate 5 and that detects the leading edge of the sheet before it reaches the outlet. The transport speed of the sheet can be changed by means of the signal generated in this way.

Figure 2:
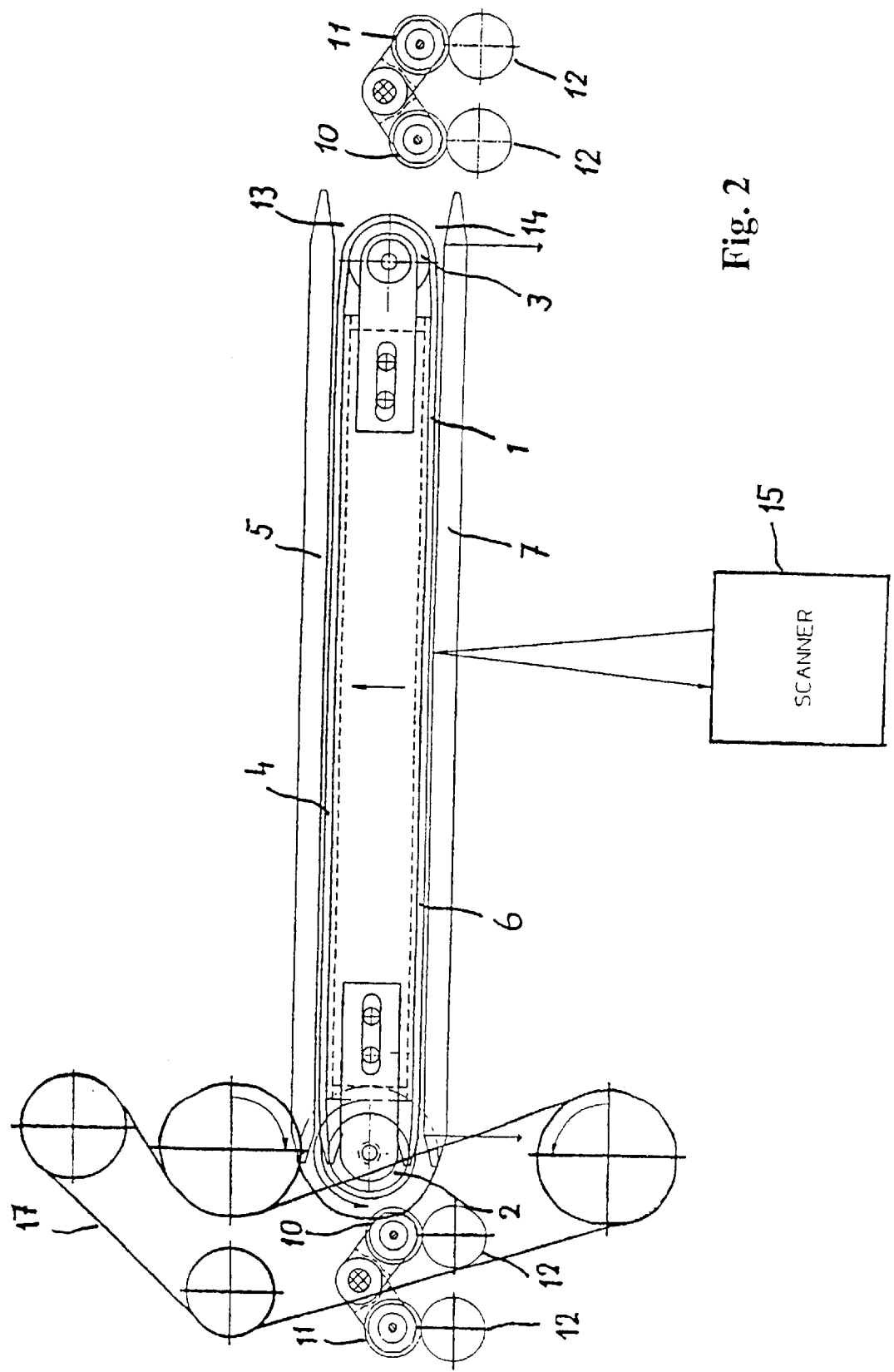
FIG. 2: a side view corresponding to FIG. 1 for reading markings on the bottom side of a sheet.

If the bottom side of the sheet is to be read, then the rollers 2, 3 with the belt 1 and the plates 5, 7 are moved upwards into the position shown in FIG. 2, where the transport rollers 10, 11 with their counter rollers 12 are located at the height of the lower inlet 14. The reading device 15 is arranged underneath the plate 7 in this case. With the transformation into the upper position, the direction of rotation of the rollers 2, 3 is simultaneously reversed. The same applies for the fans 9, where a low pressure is generated at the lower section 6.

The sheet guided from the transport rollers 10, 11 to the lower inlet 14 is fixed to the lower section 6 due to the low pressure and is transported past the reading device 15 now located below. FIGS. 3 and 4 also shows the detector 16, which is used for the detection of the leading edge of the sheet.

As already indicated, the fans 9 can be eliminated if the space between the upper and the lower sections 4, 6 is configured as a low-pressure chamber 8.

In order to simplify retrofitting, there can be two reading devices 15, one above the plate 5 and one below the plate 7.

The plates 5, 7 can be removable. The direction of rotation of the rollers 2, 3 can be reversed by an electric motor M3, which can reverse its direction of rotation. In the embodiment shown in FIGS. 1 and 2, the roller 2 is driven by a toothed belt 17, which engages to the left or to the right with teeth of the roller 2 according to the height and direction of rotation of this roller.

The transport rollers 10, 11 with their counter rollers 12 at the inlets and outlets are driven by a common electric motor M1 at the same rpm synchronously with the belt speed.

What is claimed is:

1. Device for reading sheet material, consisting of an endless, perforated belt guided over two rollers, of which one is driven, where material is guided from a feeding device to an inlet and the belt transports the material to an outlet, wherein the material is held against the belt by a low pressure acting at the perforations of the belt and there is at least one reading device that detects markings of the material transported by the belt, characterized in that there is an inlet on both sides of one of the rollers, in that the device can be adjusted relative to the feeding device, and in one position, one inlet is located at the height of the feeding device, and in the other position, the other inlet is located at the height of the feeding device, in that for a change from one position to the other, the direction of rotation of the driven rollers is reversed, and in that the one or more reading devices are directed towards the corresponding section of the belt, whose inlet is located at the height of the feeding device.

2. Device according to claim 1, characterized in that each section of the belt is covered by a transparent plate.

3. Device according to claim 2, characterized in that the plates can be removed.

4. Device according to claim 2, characterized in that the transparent plates are reduced at the inlets.

5. Device according to claim 1, characterized in that there is a low-pressure chamber between the first and the other section.

6. Device according to claim 1, characterized in that between the first and the other section there is at least one fan, whose direction of rotation is reversible, and in that the suction side of the fan is directed towards the corresponding section, whose inlet is located at the height of the feeding device.

7. Device according to claim 1, characterized in that the feeding device consists of two transport rollers arranged at a distance from each other with corresponding counter rollers.

8. Device according to claim 1, characterized in that the driven roller is driven by an electric motor that can change its direction of rotation.

9. Device according to claim 1, characterized in that the driven roller is driven by a toothed belt that engages one side of the roller in one position and engages the other side of the roller in the other position.

10. Device according to claim 1, characterized in that the reading device can be adjusted in the direction of a section and perpendicular to this direction.

11. Device according to claim 1, characterized in that in the region of an outlet there is a detector that detects the leading edges of the material and that generates a signal reducing the speed of the belt when the leading edge is detected.

12. Device according to claim 1, characterized in that the periphery of the rollers has pins that engage the perforations of the belt.

* * * * *